Jan. 17, 1933.    R. MORGAN ET AL    1,894,910
HEADLIGHT TESTING APPARATUS
Filed Feb. 10, 1930
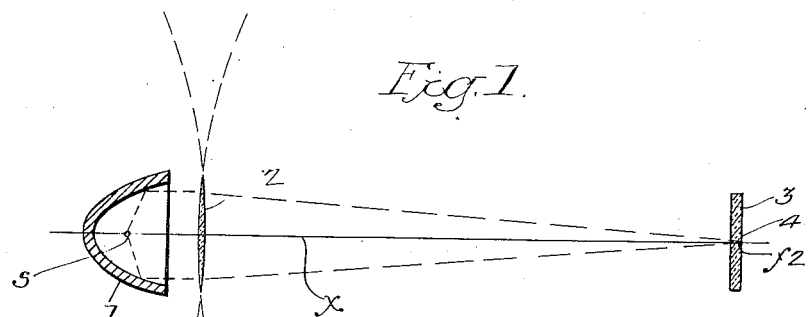
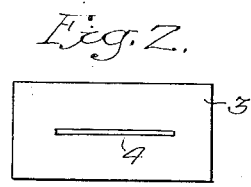
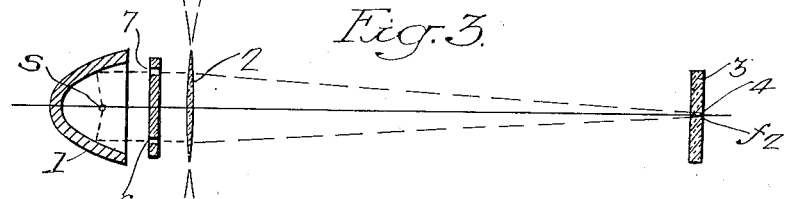
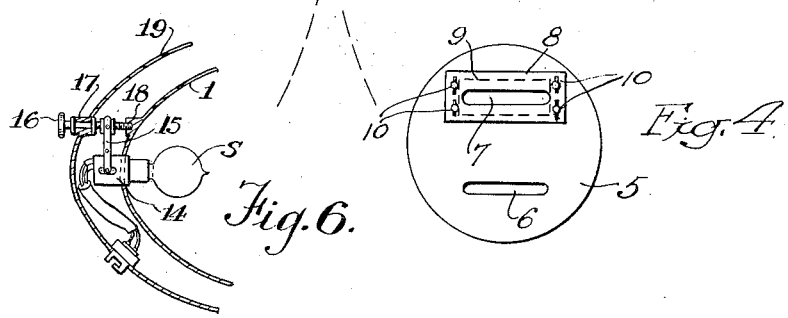
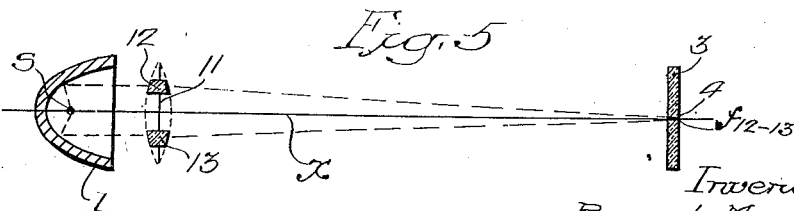
Inventors:
Raymond Morgan
Enos E. Witmer
by their Attorneys
Howson & Howson Patented Jan. 17, 1933

1,894,910

UNITED STATES PATENT OFFICE

RAYMOND MORGAN AND ENOS E. WITMER, OF PHILADELPHIA, PENNSYLVANIA

HEADLIGHT TESTING APPARATUS

Application filed February 10, 1930. Serial No. 427,347.

The present invention relates to headlight testing apparatus and particularly refers to an improved method and apparatus for focusing and adjusting automobile headlights. The general subject matter of this application is disclosed in our co-pending application, Serial No. 334,581, filed Jan. 23, 1929, the present application containing slight modifications not contained in the prior application.

The principal object of the invention is to provide a method and apparatus for focusing and adjusting headlights as, for example, automobile headlights which shall be capable of operation in relatively restricted spaces as compared to prior methods and apparatus which require a distance of from twenty-five to fifty feet for carrying out the operations.

Another object is to provide focusing and adjusting means of the type set forth which shall be universally applicable for all types of headlight lenses and which may be used with the lens removed or attached.

Other objects and advantages of the invention will appear more fully hereinafter from the following detailed description taken together with the accompanying drawing, in which:

Fig. 1 is a diagrammatic vertical sectional view illustrating a preferred embodiment of our invention;

Fig. 2 is a detail front view of one of the elements of the apparatus shown in Fig. 1;

Fig. 3 is a modification of the embodiment shown in Fig. 1;

Fig. 4 is a detail front view of the element used in Fig. 3; and

Fig. 5 is another modification of our invention.

Fig. 6 is a partial view of a headlight showing a practical means for adjusting the light source to focus the same which may be used in the headlights shown diagrammatically in the other figures.

The present generally used methods of focusing the headlights of automobiles are undesirable by reason first, that they require for operation a relatively large space generally from twenty-five to fifty feet in length and secondly, that they are not universally effective for the many different types of lens now in general use. In accordance with the present invention, we have devised a simple and highly efficient method and apparatus universally effective for all types of lenses whereby the headlights may be focused and adjusted in a very limited space.

Referring to the drawing, in Fig. 1, we have illustrated an embodiment of the method and apparatus for carrying out our invention, and, in this instance, a convex cylindrical lens 2, having a relatively long focal length, is used to bring the rays of light from the headlight reflector 1 produced by the source S to a focus within the normal conjugate focus of the headlight. It will be apparent to those skilled in the art that the lens 2 must be so positioned with respect to the headlight that the elements of the cylindrical surface of which lens 2 is a part, shall be perpendicular to the vertical plane passing through the axis $x$ or as in Figs. 1 and 3 perpendicular to the plane of the paper, otherwise the image will be blurred and not clearly defined. In connection with the convex cylindrical lens 2, we employ a suitable diffusing screen 3 (Fig. 2) which is located on the principal axis of the reflector 1 and constitutes the principal focus $f_2$ of the convex lens. By reason of the relatively large focal length of the lens 2, its thickness is relatively small and, therefore, a sharp and clearly defined image is obtained on the screen 3. If the beam of light issuing from the headlight is convergent or divergent, the pattern of light on the screen 3 will be broad and diffused, but if the beam is substantially parallel in a vertical plane, the rays will come to a focus on the screen 3 and the pattern will consist of a narrow horizontal band of light 4, as indicated in Fig. 2. In the present instance, the principal axis $x$ of the lens 2 is coincident with the principal axis of the parabolic reflector 1. The process of focusing on the screen 3 is precisely the same as the usual process of focusing on a screen twenty-five or fifty feet distant, that is, by reducing the width of the beam of light in a vertical direction to a minimum. The distance between the lens 2 and the screen 3 may vary largely but generally two to four feet will be found desirable in the practice of our invention, this distance constituting the focal length of the lens.

In Fig. 3 is shown a modification quite similar to that of Fig. 1 with the exception that a disk 5 is used which has a pair of horizontal slits 6 and 7 therein so that only a portion of the light from the reflector 1 is intercepted by the lens 2. The light issuing from the slits 6 and 7 produces an image of the slits on the ground glass screen 3 by means of the lens 2 which brings the rays to a focus at its principal focus $f_2$. The process of focusing in this instance will then consist in bringing the two light bands from the slits 6 and 7 into coincidence on the ground glass plate 3 which is at the principal focus $f_2$ of the lens 2, as in Fig. 1. When the two light bands are coincident, it is an indication that the rays reflected from the reflector 1 are substantially parallel in a vertical plane. The process of focusing, of course, may be accomplished in the usual manner by moving the source of light until the images of the slits are coincident indicating vertical parallelinity of the rays from the reflector 1 as explained.

Fig. 4 illustrates in detail the disk 5 which is used in Fig. 3 for transmitting only a portion of the light from the reflector 1 and constitutes an element 5 with one fixed slit 6 and an adjustable slit 7, this latter slit being formed in a plate 8 adjustably fitted on the element 5, as indicated, and the latter element being cut away in part at 9 in back of the adjustable plate 8 to permit the slit 7 to function. The plate 8 may be adjusted vertically to vary the distance between the slit 6 and the slit 7 by means of the butterfly nuts 10 or any other suitable means. This adjustable disk is provided so that the testing apparatus may be adapted for use with many different sizes and designs of headlight lenses which are encountered in general practice. In certain of these headlight lenses, one or both of the slits 6 or 7, when the element 5 is properly arranged with respect to the headlight, may fall in front of a horizontal irregularity or discontinuity in the surface of the headlight lens and, thereby, cause an undue amount of vertical spreading of the light coming through the slit or slits. It is, therefore, desirable to provide an adjustment for varying the distance between the two slits until clearly defined images are produced. This construction will also be useful in dealing with types of lenses in which the prism angle for the top part is sufficiently different from the prism angle of the lower part to cause an appreciable deviation from vertical parallelinity of the two beams issuing from the slits 6 and 7 when the light source is at the principal focus of the reflector 1.

In Fig. 5 is shown a modification in which a shield 11 having portions 12 and 13 of a convex cylindrical lens attached thereto is substituted for the element 5 of Fig. 3. In this modification, the screen 11 provides a double function in that it serves to screen most of the light projected from the reflector 1 except that which may pass through the lens portions 12 and 13 and simultaneously provide the means for focusing the portions of the light beam passing through the lens portions 12 and 13 on the screen 3 which is located at the principal focus of the convex lens of which the portions 12 and 13 constitute equal segments. The process of focusing in this instance is the same as in Fig. 3 and consists in bringing the two light bands from the lens portions 12 and 13 into coincidence on the ground glass plate 3.

In Fig. 6 there is shown a practical headlight construction wherein the light source or lamp is adjustable with respect to its reflector to focus the device. It might be well to explain the process of focusing a headlight at this time. This process consists in adjusting the position of the light source along the principal axis of its reflector until it lies at the principal focal point of the reflector, at which time the rays of light reflected from the device will be parallel. In the device of Fig. 6, the lamp S is removably carried by socket 14 which is in turn supported by carriage member 15. This member threadedly engages adjusting screw 16 which is suitably journaled in bearings 17 and 18 carried by casing 19 and reflector 1 respectively. Obviously by turning screw 16, the lamp is caused to move along the principal axis of reflector 1 and may be suitably focused as described above. This specific construction or any other conventional focusing means may of course be used in the headlights shown diagrammatically in the other figures.

While we have shown several embodiments of our invention for the purposes of illustration and description, other changes and modifications therein may be apparent to those skilled in the art and we, therefore, desire to be limited only by the scope of the appended claims.

We claim:

1. The method of testing and adjusting a headlight, adapted to reflect a beam from a source of light, which comprises isolating a plurality of components of said reflected beam, intercepting said components by means of a lens, obtaining an image of each of said components at the principal focus of said lens, adjusting the distance between the components until the images are clearly defined, and adjusting the source of light until the images are brought into substantial coincidence.

2. Apparatus for testing and adjusting a headlight having a source of light, a reflector for reflecting a beam from said source, and means for adjusting the light source with respect to said reflector, comprising means for dividing said beam into components, a lens for intercepting said components, means for obtaining an image of each of said components at the principal focus of said lens, and means for adjusting the distance between said components whereby said images may be more clearly defined, whereby the light source may be adjusted to bring the images of said components into substantial coincidence.

3. Apparatus for testing and adjusting a headlight having a source of light, a reflector for reflecting a beam from said source, and means for adjusting the light source with respect to said reflector, comprising means for dividing said beam into components, a convex cylindrical lens having a relatively large focal length for intercepting said components, means for obtaining an image of each of said components at the principal focus of said lens, and means for adjusting the distance between said components at their source whereby said images may be more clearly defined, whereby the light source may be adjusted to bring said images into substantial coincidence.

RAYMOND MORGAN.
ENOS E. WITMER.